United States Patent [19]

Borello

[11] 4,183,253
[45] Jan. 15, 1980

[54] DUAL SURFACE ANGULAR POWER TRANSFER WHEEL TRACTION NIPPING DEVICE

[76] Inventor: Domenic Borello, 142 Nyac Ave., Pelham, N.Y. 10803

[21] Appl. No.: 766,363

[22] Filed: Feb. 7, 1977

[51] Int. Cl.² .................. F16H 15/16; F16H 15/08
[52] U.S. Cl. ........................................ 74/193; 74/199
[58] Field of Search ................................. 74/193, 199

[56] References Cited

U.S. PATENT DOCUMENTS

| | | | |
|---|---|---|---|
| 1,844,239 | 2/1932 | Boehme et al. | 74/193 |
| 2,865,213 | 12/1958 | Pernollet et al. | 74/193 |
| 3,286,537 | 11/1966 | Riley | 74/193 |
| 3,414,665 | 12/1968 | Parrish | 74/193 |

Primary Examiner—Ronald C. Capossela

[57] ABSTRACT

The present invention relates to a traction nipping drive employing cones, tapered cylinders, spheres and an uniquely designed angular power transfer wheel. The power transfer wheel is capable of matching the angles of the driver cones, spheres, or tapered cylinders to the driven cones, spheres or tapered cylinders, permitting them to engage each other in a point to point relationship. This point to point relationship remains continuous through the complete range of the drive. The same power transfer wheel, is thereafter also capable of engaging the cones, spheres or tapered cylinders in a point to point relationship for the entire speed range of the drive. An essential criteria of this invention is the use of a prior art technique as shown in U.S. Pat. No. 3,894,439. This technique employs the positive simultaneous driving of all driven and driver discs, cones and tapered cylinders, so that all surface movements are matched in the driving and driven action. This is accomplished by chains, gears, belts, shafts, etc.. This technique has the capacity of not only simultaneous traction, but also a controlled nipping by compression, of one or more of the components against each other.

13 Claims, 12 Drawing Figures

DUAL SURFACE ANGULAR POWER TRANSFER WHEEL TRACTION NIPPING DEVICE

DISCUSSION OF THE PRIOR ART

Friction-traction drives are not truly traction drives as they do not continuously engage each others surfaces through the driver and driven components, in a point to point relationship along the range of their speed. Their geometric configuration does not permit their driver and driven components to remain on a fixed shaft axis or center lines, or to add components to improve the overall effeciency of the drive. As a result, the necessary pressure to maintain adequate traction is missing. Furthermore, they do not employ the principle of engaging themselves simultaneously so that the driver and driven components are in a nipped rolling configuration, similar to the method used in the reduction of metals and the formation of metal shapes, (rolling mills).

SUMMARY OF THE INVENTION

This invention has successfully achieved the correct geometric configurations so that the following actions occur in a natural manner;

The drive allows a constant pressure employed in such a way that all driver power transfer wheels and all driven components are in a wedged nipped condition, and are kept in that condition by the use of springs and/or hydraulic pressure. The pressure is maintained by the driver component and the power transfer wheel which float, or the driven component and the power transfer wheel which also float, thus maintaining a costant and continuous pressure without any need for adjustment. Due to the fact that these components float, the drive can be placed into neutral at any point along its drive range.

The drive can be driven in speeds comparable to the rated speed of the shaft bearings without the usual heat buildup, due to the perfect match accomplished by the power transfer wheel and to the new traction lubricants that are available.

The power transfer wheel does not disengage, should the power transfer wheel's axis or center line drop slightly below the axis or center line of the input or output shafts, it would in fact lock in, and not disengage.

Additional components can be added, thus increasing the output horsepower.

The range of input speed to output speed can be limitless, for example, by adding another cone and another power transfer wheel the ratios are increased by approximately four times the output of two cones, and the ratio is squared each time another power transfer wheel and another cone are added.

This drive can also operate effectively with only one input cone or tapered cylinder and using the power transfer wheel as the output, or by combining two input cones or two tapered cylinders whose angles run together, with the power transfer wheel located between them, causing a nipping traction action converging upon the power transfer wheel which in this design is used as the output component. This arrangement reduces the ratio of the input to output potential, but has the advantage of requiring less parts to operate so that where a large speed ratio is not necessary, the drive can be manufactured more economically.

The manner in which the components of the drive are arranged permits a positive start when starting from the lowest point of the drive range. This is accomplished by a chain link from the driver shaft to the driven shaft onto an overriding clutch. When the speed of the driven shaft exceeds the speed of the starting chain link drive speed, the output drive overrides the overriding clutch.

It is the object of this invention to eliminate all back scrubbing, slipping and differences of movement between power transfer rotating parts and to reduce the number of working parts that transfer the input horespower and speed to the output horsepower and speed. Therefore, this invention is aimed at providing a highly effecient variable speed traction drive, that is less expensive to manufacture and maintain because it does not require highly skilled labor to manufacture or repair.

According to this invention; the scrubbing, slipping and differences of movement encountered in the prior art have been eliminated by the use of a power transfer wheel that is geometrically configurated to allow the transfer of rotational movement from a cone or tapered cylinder, while maintaining point to point traction. It also permits combinations of cone and tapered cylinder surface angles, to be placed parallel and to remain parallel, while simultaneously maintaining parallel shaft connections and rotating shaft center lines. Further, it corrects the mismatch between the following shapes and combinations of shapes: a sphere with a concave sphere, an internal cone cylinder with a one sided cone, an internal cone cylinder with a two sided cone, an internal cone cylinder with an internal cone cylinder, an externally tapered disc with an externally tapered disc, and an internally tapered disc with an internally tapered disc.

The primary design feature of the power transfer wheel is the fact that it can be driven on a single axis, and yet have two separate and distinct shapes and surfaces that act as two separate and distinct point to point traction surfaces. This action is accomplished by placing the rotating axis on an angle that is compatible with the angle or curve of the driver and driven components.

For the purpose of better understanding the manner in which this unique power transfer wheel corrects the mismatch between parellel surfaces, the illustrations set forth in this invention will place the wheel so that the action becomes visible. It is also the intention that the other illustrated embodiments be considered as part of the invention, and although it is the power transfer wheel that allows this drive to be completely successful, the other configurations illustrated, because they result in a viable variable speed drive, be considered as part of the claims The illustrations will show two methods using the nipping action through the power transfer wheel that is geometrically configurated so that all rolling surfaces can be nipped, and will follow each other point to point without the problems of the prior art, such as: the necessity of constant pressure through an auxillary external force and the relocation of its rotating axis, backsliding, slipping, and scrubbing.

PREFERRED EMBODIMENT

The dual surface angular power transfer wheel interconnects a driver and a driven cone.

The power transfer wheel's diameter has an angle which is equal in length on both sides of the width of the wheel, the angle is precisely the same as the cone angle.

The wheel is positioned between two cones whose angles are facing in opposite directions, so that the large diameter of one cone is in the opposite position of the other cone, while both of the cone shafts and angular surfaces are running parallel to each other.

The power transfer wheel interconnects the two cones in the following manner: the power transfer wheel is permanently set at an angle from its axis, so that the smaller diameter end of the power transfer wheel is in contact with the small diameter end of one of the cones, the other angled side of the power transfer wheel engages the other cone, so that the power transfer wheel's smaller diameter end is in contact with the small diameter end of that cone.

The angles on the power transfer wheel are exactly the same as the angles of the cones that they are in contact with. Thereby, correcting any mismatch that occurs in the prior art. This is the same principle employed when combining miter gears, or bevel gears, or two rollers whose diameters are equal along their lengths, and that engage each other in traction.

The power transfer wheel is carried by a splined hollow shaft in the center of the space between the two parallel angles of the cones. This shaft runs parellel to the angle of both cones.

The power transfer wheel has a splined angular wheel axis shaft housing, running at the same angle from the center line as the angle on the cones, and the angle of the splined hollow shaft.

The power transfer wheel is maintained in its position between the two cones, by the splined hollow shaft that is in the splined angular wheel axis shaft housing of the power transfer wheel.

The speed of the drive is increased or decreased by moving the power transfer wheel in a linear direction on the splined hollow shaft along the parallel lines of the cones.

The splined hollow shaft is fixed in its position at both ends, so that it maintains the power transfer wheel in its position, relative to the cones.

The driver and the driven cones are carried by a spline shaft.

The cone bores are also splined, so that they move on the splined shaft in a linear direction.

Situated behind both cones, on the large diameter sides, are a hydraulic cylinder and a piston that when activated cause a spring to push the cones so that they wedge and lock the power transfer wheel, thus causing a sufficient pressure to produce a positive traction between the components.

When the power transfer wheel is positioned so that the small end of the driver cone is engaging the power transfer wheel, the drive is then in its lowest speed position.

Attached to the driver shaft at its outer end, at the larger diameter end of the cone, is a sprocket which is attached to a larger sprocket, that is attached to an overriding clutch, that is attached to the shaft on the smaller diameter end of the driven cone.

The following will describe the drive and its cycle: Upon activating a master cylinder the hydraulic pistons drive the two springs, that move the two cones, so that they become locked with the power transfer wheel for traction. When the driver cone is made to rotate with a power transfer wheel placed in its lowest speed position, the small sprocket on the input shaft engages the output shaft directly through a chain, to a larger sprocket, at the same ratio of the power transfer wheel. When the power transfer wheel is made to move in a linear direction so as to increase the speed of the output shaft, the small sprocket is disengaged through an overriding clutch that is placed on the outer end of the driven shaft that has the large sprocket affixed to it. The power transfer wheel can travel the full range of the speed of the drive. This is accomplished by a servo motor that moves a chain linearly through the hollow splined shaft. The chain is linked to the power transfer wheel through a slot in the hollow splined shaft. The return or neutral is accomplished in the following manner: To place the drive in neutral and reduce the speed the master cylinder is opened so that the hydraulic pistons release the driving force on both cones, thus removing all of the traction forces, and at that point, a spring that is in constant tension returns the power transfer wheel to its lowest speed position. All wedging is accomplished by placing the power transfer wheel slightly above center, so that it is drawn into the driver and driven cones. All driven and driver components, and power transfer wheel s maintain a parellel relationship to each other. They also maintain the same relative surface movement in any conceivable movement of the drive during its operation prior to, and after its shutdown.

The above description, as well as further objects, features and advantages of the present invention, will be more fully appreciated by reference to the following description taken with the drawings wherein.

Figure 1:
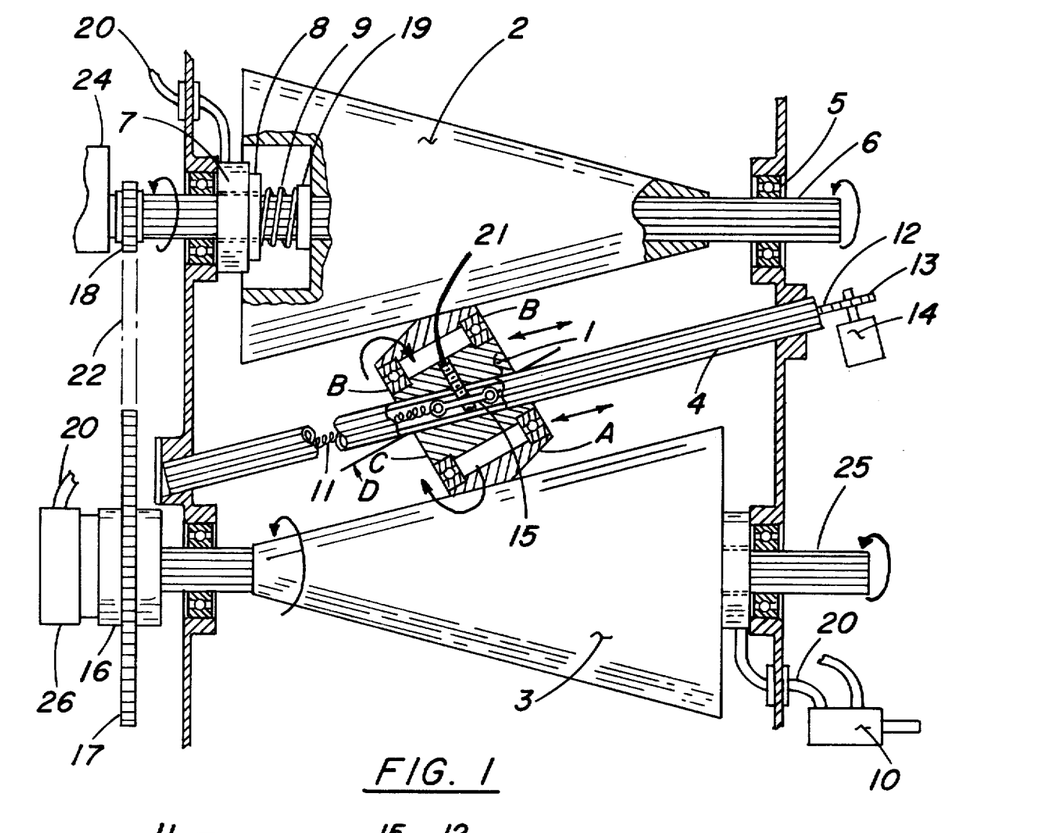
FIG. 1 is a top view of the preferred embodiment showing the manner in which the power transfer wheel 1 interconnects the rotational input with the rotational output and the way it corrects the mismatch of two angles of the two cones 2 that are faced in opposite directions.

FIG. 1, the preferred embodiment, will be used to describe the drive. Because all of the rotating components are similar, the drawings from FIG. 1 to FIG. 9A have been given the same number and letter designations. Therefore, the preferred embodiment FIG. 1, will represent most of the details in the other embodiments FIGS. 2 through 9A. In all of the FIGS., from FIG. 1 to FIG. 9A the power transfer wheel 1 is used as the device to correct the angular and spherical mismatch between the input cones 2 and the output cones 3 thereby, making all the FIGS. from 1 to 9A basically alike, so as to clearly define that this invention is one invention having various methods of design and manufacture.

FIG. 1 the preferred embodiment, has been designed to replace the transmission of an internal combustion engine or used in an electric vehicle as a speed control. Therefore the cycle would start in the following manner; assuming this to be an electric vehicle using an electric motor 24 as the rotating power input, and also assuming that the motor 24 is not running and that the power transfer wheel is at is lowest speed, the following would take place: The hydraulic master cylinder 10 would be activated so that it would send hydraulic fluid through hose 20 to the two cylinders 7 and clutch 26 thus pushing the pistons 8, they would bear against the springs 9, the springs in turn would bear against the thrust bearing 19, which in turn would push the input cone 2 along the splined shaft 6, and simultaneously push the output cone 3 along its splined shaft 26 in the opposite direction, the motor 24 would then start running at its rated speed with direct engagement to clutch 26 to shaft 25. Sprocket 18, which is connected by a chain 22 to sprocket 17 that is fixed to the drive part of an overriding clutch 16, is then driven at a speed equal to the speed of the driven cone 3. The driven cone 3, which is connected to the splined shaft 25 which is also connected to the overriding part of the overriding clutch 16, directly connects the splined shaft 6 to splined shaft 25 thereby, placing the drive FIG. 1 in its lowest speed, connecting it directly to the load. Drive cones 2 and driven cones 3 are as FIG. 1 depicts, facing in opposite directions. Therefore, the transfer of rotational movement through the power transfer wheel 1, by which the speed is increased or decreased is achieved when the power transfer wheel 1 is moved from right to left along the hollow splined shaft 4, so that when the power transfer wheel 1 is at the extreme right of the drive FIG. 1 it is at the lowest output speed and as the power transfer wheel 1 is moved along the hollow splined shaft 4 the output speed is increased. The manner in which the power transfer wheel 1 is moved so that a speed change occurs, is as follows; after the motor 24 is turned on, the servo motor 14 turns sprocket 13 so that chain 12 is lengthened into the hollow splined shaft 4, spring 11 then moves the power transfer wheel in the direction of a higher speed. Spring 11 and chain 12 are linked to the power transfer wheel 1 by a holder bar 15, the holder bar 15 is connected to a pin 21 that runs through a slot in the splined hollow shaft 24 and is thereafter, connected to the axis splined housing-C- of the power transfer wheel 1. A spring 11 which is in constant tension, is connected to one end of the holder bar 15 which goes through a slot in the hollow splined shaft 4 and is connected to the axis splined housing-C-, pulls the power transfer wheel to a higher speed position. The spring 11 continues to pull the power transfer wheel until it is in its highest speed position. As the spring 11 draws the power transfer wheel to a higher speed, chain 12 maintains a constant tension. When it is necessary to lower the speed, the servo motor 14 turns sprocket 13, which in turn pulls chain 12, which is linked to the other side of the holder bar 15, and pulls the power transfer wheel, so that the drive is in its lowest speed position. When it is necessary to place the drive into neutral the master cylinder 10 releases the hydraulic pressure, so that drive cone 2, and driven cone 3 allow the cones to release their tension on the power transfer wheel 1 and to release clutch 26 from shaft 25, so that the direct drive is also in neutral. The servo motor 14 returns the power transfer wheel 1 to its low speed position and then stops running. When the power transfer wheel 1 returns to its lowest position and is locked into that position, immediately thereafter, motor 24 is turned off.

To further describe the operation of the drive FIG. 1 and the differences between this variable speed drive and other drives that employ cones, it is necessary to fully understand the function and rotational relationship between the power transfer wheel 1, the input cones 2, and the output cones 3. Therefore, it is necessary to start with input cone 2 and the manner in which it transfers its peripheral conical linear surface movement to the perepheral conical linear movement of the power transfer wheel 1, and infinitely maintains a point to point contact through the speed range. The included angle of the input cone 2 matches the included angle of one side of the power transfer wheel 1, the input cone 2 is in contact with only one side of the power transfer wheel 1 thereby, reducing the potential for wear, heat, and fatigue by approximately 50%. This relationship of matched cone shapes is therefore, the same as two wheels without any angle, but whose diameters are equal on both ends and are used as traction for the transfer of their rotational movement from one to the other.

Figure 2:
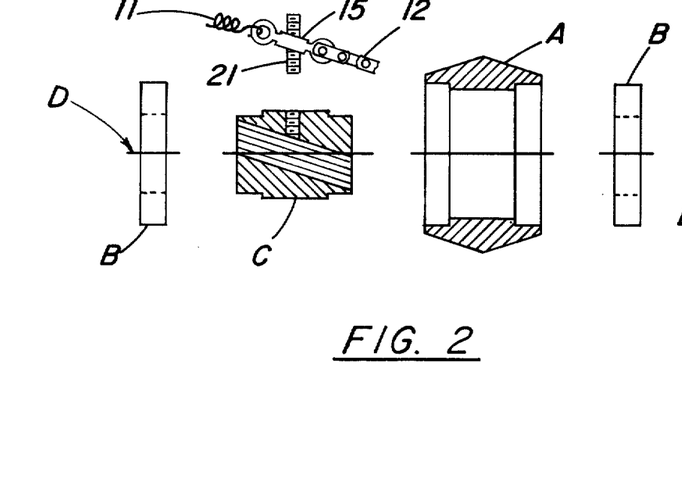
FIG. 2 is an exploded sideview of the power transfer wheel 1 showing the connecting pin 21, chain 12, and return spring 11.
Figure 2A:
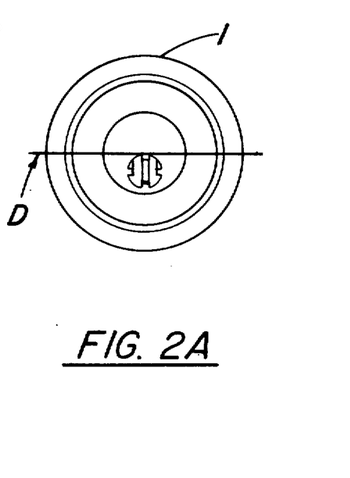
FIG. 2A is a side view of FIG. 2 excluding the carrier.

The power transfer wheel 1 is set between two parallel, but conical shaped rolls 2 and 3, so that by pitching the power transfer wheel 1 at such an angle that it fits between the input cone 2 and the output cone 3, and using both sides of its angular shape, its angles engage the cones in a natural way, so that all of the rotating pomponents are constantly traveling in a natural way at the same peripheral conical linear surface movement regardless of the position of the power transfer wheel. The hollow splined shaft 4 serves as a carrier for the power transfer wheel only, and is positioned in the center of drive cone 2 and driven cone 3. The power transfer wheel's 1 axis -C- FIG. 2 is a splined housing that establishes the rotating axis of the power transfer wheel 1 and also prevents the power transfer wheel 1 from losing its parallel relationship with the input cone 2 and the output cone 3. The letter -D- FIG. 1 represents the axis of the power transfer 1 and is a reference line only.

Figure 3:
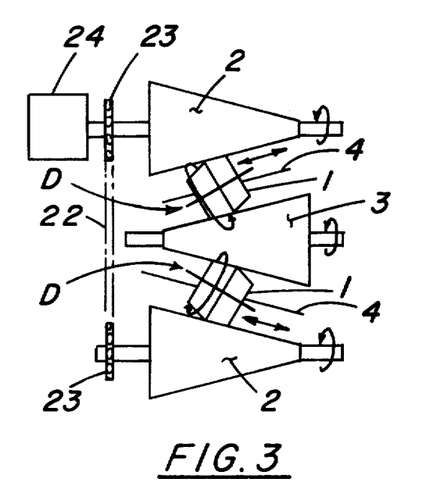
FIG. 3 is a top view of the preferred embodiment with two input cones 2 straddling one output cone 3 thereby, adding to its traction and horsepower capability.

FIG. 3 is a top view of the preferred embodiment showing two input cones 2 nipping and driving two power transfer wheels 1, which in turn nip and drive the output cone 3. FIG. 3 also shows the interconnection between the two input cones 2, so that they act as a simultaneous rolling force upon the power transfer wheel 1 and output cone 3. The interconnection is made through the two sprockets 23 and joined by a chain 22.

Figure 4:
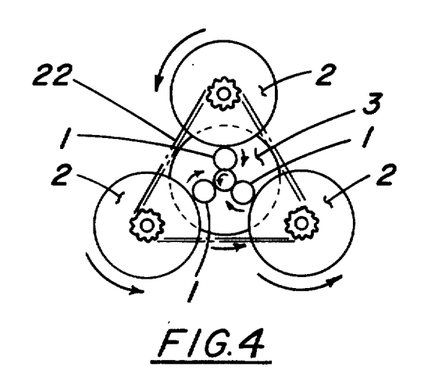
FIG. 4 is a top view of the preferred embodiment and shows a means of multiplying the ratio of the drive by placing the power transfer wheel 1 in a third cone 3 at low ratio.

FIG. 4 is a side view of the preferred embodiment with three input cones 2 set 120 degrees apart nipping and driving three power transfer wheels 1, that are nipping and driving one output cone 3 FIG. 4 also shows the interconnection between the three input cones 2, so that they act as a simultaneous rolling force upon the three power transfer wheels 1 and the output cone 3. The interconnection is made through the three sprockets 23 and joined by chain 22.

Figure 5:
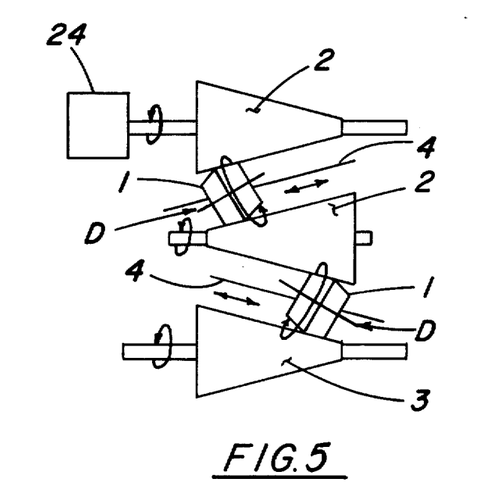
FIG. 5 is a side view of the preferred embodiment where the output cone 3 is circumferentially surrounded by three power transfer wheels 1 driven by three input cones 2 so as to further add to the traction and horsepower rating of the drive.

FIG. 5 is a top view of the preferred embodiment showing the method in which the input to output ratio can be greatly increased. Assuming that the input cone 2 driven by motor 24 is rotating at 200 RPM and that it is interconnected by the power transfer wheel to the center cone 2, so that the center of cone 2 will rotate at a 1 to 4 ratio, making the center cone rotate at 800 RPM, center cone 2 is thereafter, connected to output cone 3 at a 1 to 4 ratio, so that the output cone 3 would rotate at 3,200 RPM at its highest speed.

To find the lowest speed we will start with cone 2 that is driven by motor 24 and place the power transfer wheel 1 at the smaller end of the cone that is attached to motor 24, and assume that the motor 24 is rotating cone 2 and that cone 2 is interconnected to the center cone 2 by the power transfer wheel at a 4 to 1 ratio, so that the cone 2 will rotate at 50 RPM, center cone 2 thereafter, connected to output cone 3 on its small end by the power transfer wheel at a 4 to 1 ratio, so that the output cone 3 would rotate at 12.5 RPM resulting in a ratio of 256 to 1. However, if another cone is added the 3,200 RPM high speed is multiplied by 4, thus increasing it to 12,800 RPM and the 12.5 RPM low speed is divided by 4 thus decreasing it to 3.125 RPM resulting in a 4,096 to 1 ratio, making this an infinitely variable speed drive.

Figure 6:
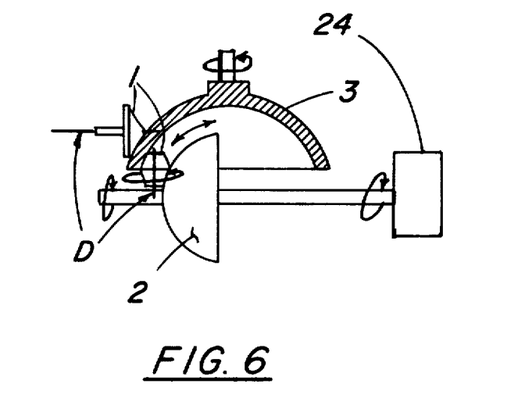
FIG. 6 is a cutaway of a top view showing a semisphere 2, whose rotation is interconnected to the output concave sphere 3 through a power transfer wheel 1, this power transfer wheel 1 in turn transfers its rotation to the output concave sphere 3. another power transfer wheel 1 is used as a brace to prevent the concave sphere from flexing.

FIG. 6 is a cutaway of a drive wherein the drive semisphere 2 is driven by motor 24 and is interconnected by a power transfer wheel 1, whose two sided concave and convex shape corrects the mismatch of the output concave sphere 3, so that the power transfer wheel supported on its axis -D- causes a transfer of rotation. FIG. 6 also places a power transfer wheel 1 on the opposite side of the concave sphere 3, so that the concave sphere 3 is prevented from flexing without the usual counter productive effect between the support 1 and the drive member 3.

Figure 7:
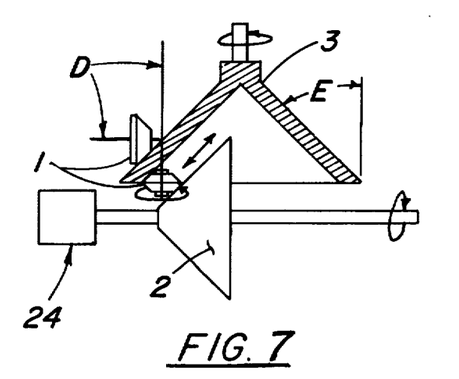
FIG. 7 is a cutaway of a top view of a cone 2 with a tapered cylinder using the same construction as in FIG. 6.

FIG. 7 is of the same construction as FIG. 6 except that it is an internal cone 3 with an external cone 2 using a power transfer wheel 1. The letter -E- represents a 45 degree angle that is necessary to produce a match between the parallel surfaces of the cones 2 and 3. In this design the power transfer wheel 1 has a greater contact area between itself and the internal cone 3.

Figure 8:
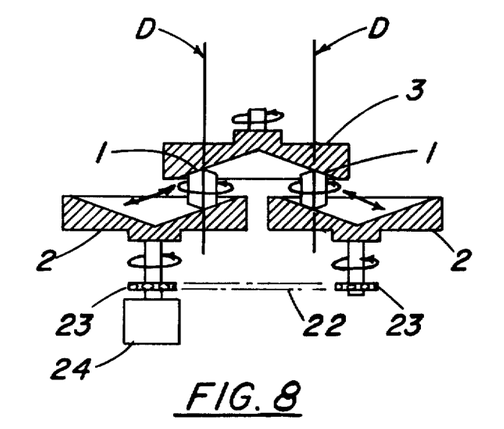
FIG. 8 is a cutaway of a top view showing two input internal discs 2 whose rotation is interconnected to an output internal disc 3 through two power transfer wheels 1

FIG. 8 represents a cutaway of a drive using three internal disc 2,2, and 3 and two power transfer wheels 1. Following is a brief description; motor 24 drives input disc 2 which is connected by sprocket 23 to another input disc 2 which is connected to sprocket 23 by chain 22. The two input discs 2 drive the two power transfer wheels that are supported on their axis -D-, so that the two power transfer wheels 1 turn the output disc 3. In this design input discs 2 & 3 have a greater contact area upon the power transfer wheel 1.

Figures 9, 9A, 9B:
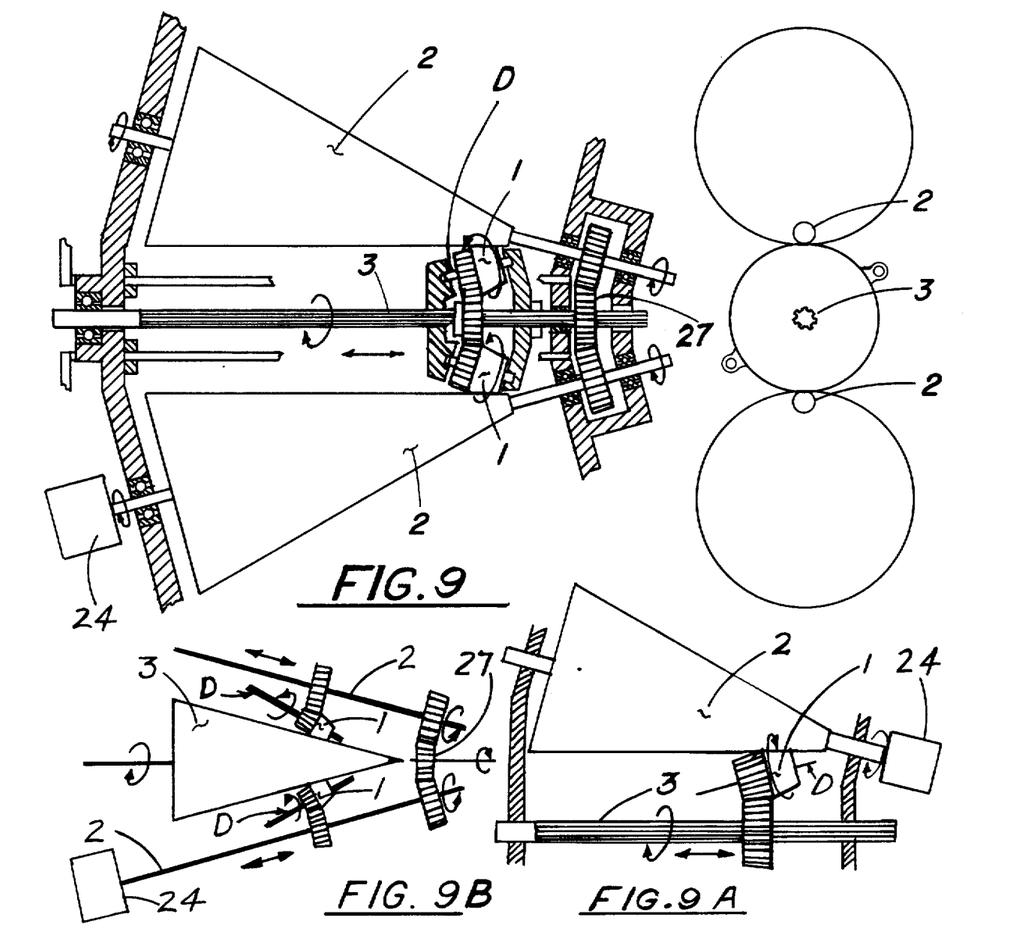
FIG. 9 is a cutaway of a top view wherein, two input cones 2 are facing in the same direction, so that the ratio potential is diminished. This represents another method of correcting the mismatch between a cone 2 and a gear, by the use of the power transfer wheel 1.
FIG. 9A is the same as FIG. 9 with the exception that only one cone and one power transfer wheel is used.
FIG. 9B is the same as FIG. 9 with the exception that only one cone is used with two power transfer wheels.

FIG. 9 is a top view of a cutaway showing a method whereby two cones 2 facing in the same direction drive two power transfer wheels 1. In this instance, the power transfer wheel 1 is designed so that one side of the power transfer wheel is used for traction, and the other side is shaped as a gear, so that the following would occur; motor 24 would turn one of the input cones 2, input cone 2 would in turn, through a gearing and idler 27 turn the other input cone 2. As a result both input cones, would by traction simultaneously drive the two power transfer wheels 1, so that through gearing the power transfer wheels 1 would turn the splined output shaft 3. When a speed change is necessary, the power transfer wheels 1 would move from one end of the drive to the other. In this design the ratio is limited. However, it exhibits another method and shape of the power transfer wheel FIG. 9A demonstrates another feature of this design, where it is possible to use one input cone 2 and one power transfer wheel 1, the cycle would then be as follows; motor 24 turns input cone 2 which in turn by traction, turns power transfer wheel 1, power transfer wheel 1 by gearing, turns splined output shaft 3, resulting in an inexpensive drive.

FIG. 9B operates in a similar manner as FIG. 9A with the improved features whereby the output cone 3 is simultaneously nipped and rolled, so that traction and drive is greatly increased. The manner in which it operates is as follows; motor 24 turns input splined shaft 2 which is connected by gearing, to the other input splined shaft 2. The two input splined shafts 2 thereafter by gearing, are connected to the power transfer wheels 1 on both sides of the output cone 3 resulting in a nipping rolling traction action at the output cone 3.

What is claimed is:

1. In a dual surface angular power transfer wheel traction direct drive nipping infinitely variable speed drive, a pair of first and second truncated friction members set within a case and mounted for rotational and linear movement upon splined shafts; said splined shafts being mounted upon fixed axes within said case; said first and second friction members being engaged for transmission of rotation from one to the other, and being also shiftable along their axes in a line oblique to the tangential plane of contact; between said first and second friction members a third transmission member and connected means mounted for rotational movement upon bearings and having a fixed axis positioned between and slightly above the axis line of the said first and second friction members; said third transmission member set upon said bearings that are set upon and carried by a splined non-rotating housing; said splined housing having a splined hollow slotted non-rotating shaft fitted to it; said shaft being fixed at both ends by splined bores in said case; fitted within said hollow slotted splined shaft is a return spring linked at one end of the said hollow slotted splined shaft; said return spring being linked at its other end to one end of a member that is fitted about a screw that rides withih the slot of said hollow slotted splined shaft; said screw being threaded into said splined non-rotating housing; attached to the other end of said member that is fitted about said screw is one end of a speed change sprocket; the other end of said speed change sprocket is linked to a speed change sprocket; said sprocket being fixed to a shaft of a servo motor; said servo motor set upon a base and fixed to the outer side of said case; said first shiftable rotatable friction member having a splined bore that is fitted to the first splined shaft; said first shaft having fitted about it a splined bored sprocket that is located on the outside of said case and that is connected for transmission of rotation by a chain to a second sprocket that is fixed upon the drive side of a one way clutch and located on the outside of said case; the slip side of said one way clutch having a splined bore that is fitted to a second splined shaft that is fitted into the splined bore of the said friction member mounted for linear rotatable movement upon a fixed axis and set within said case.

2. In a dual surface angular power transfer wheel traction direct drive nipping infinitely variable speed drive, a pair of first and second truncated friction members set within a case and mounted for rotational and linear movement upon splined shafts; said splined shafts being mounted upon fixed axes within said case; said first and second friction members being engaged for transmission of rotation from one to the other, and being also shiftable along their axes in a line oblique to the tangential plane of contact; between said first and second friction members a third dual surfaced transmission member and connected means mounted for rotational movement upon bearings and having a fixed axis positioned between and slightly above the axis lines of said first and second friction members; said thid dual faced transmission member set upon said bearings that are set upon and carried by a splined non-rotating housing; said third dual faced friction member being so pitched that the first angle of said third dual faced friction member matches precisely and geometrically the angle which it is in contact with of said first friction member, and the opposite angle of the said dual faced friction member matches precisely the angle which it is in contact with of said second friction member; said dual faced friction member being maintained at its said pitch and axial relation to said first and second friction members by said splined hollow shaft fitted to it; said hollow splined shaft being fixed at both ends by splined bores in said case; fitted within said hollow slotted splined shaft is a return spring linked at one end of the said hollow slotted splined shaft; said return spring being linked at its other end to one end of a member, that is fitted about said screw that rides within the slot of said hollow slotted splined shaft; said screw being threaded into said splined non-rotation housing attached to the other end of said member that is fitted about said screw is one end of a speed change chain sprocket; the other end of the said speed change chain sprocket is linked to a speed change sprocket; said speed change sprocket being fixed to a shaft of a servo motor; said sevo motor is set upon a base and fixed to the outside of said case; said first shiftable friction member having a splined bore that is fitted to the first splined shaft; said first shaft having fitted upon it a splined bored sprocket that is located on the outside of said case, and that is connected by a chain to a second sprocket that is fixed upon the drive side of a one way clutch and located on the outside of said case; the slip side of said one way clutch having a splined bore that is fitted to a second splined shaft is fitted to said friction member mounted for linear movement upon a fixed axis set within said case.

3. In a dual surface angular power transfer wheel traction direct drive nipping infinitely variable speed drive, a pair of first and second truncated friction members set within a case and mounted for rotational and linear movement upon splined shafts; said splined shafts being mounted upon fixed axes within said case; said first and second friction members being engaged for transmission of rotation from one to the other, and also being shiftable along their axes in a line oblique to the tangential plane of contact; between said first and second friction members a third transmission member and connected means mounted for rotational movement upon bearings and having a fixed axis positioned between and slightly above the axis lines of the first and second friction members; said third transmission member set upon said bearings, that are set upon and carried by a splined non-rotating housing; said splined housing having a splined hollow slotted non-rotating shaft fitted to it; said shaft being fixed at both ends by splined bores in said case; fitted within said hollow slotted splined shaft is a return spring linked at one end of the said hollow slotted splined shaft; said return spring being linked at its other end to one end of a member that is fitted about a screw that rides within the slot of said hollow slotted splined shaft; said screw being threaded into said splined non-rotating housing attached to the other end of said member that is fitted about said screw is attached to one end of a speed change chain sprocket; said other end of speed change chain sprocket is linked to a speed change sprocket; said sprocket being fixed to a shaft of a servo motor; said servo motor set upon a base and fixed to the outer side of said case; said servo motor, when energized, causes said speed change sprocket chain to be wrapped about said motor sprocket, drawing said dual faced third friction member linearly upon said splined hollow slotted shaft and within the parallel gap of said first and second friction members, resulting in a speed change; said angular third friction member returns to its original position by being pulled back by said return spring whenever the said servo motor is deenergized; said first shiftable rotatable friction member having a splined bore that is fitted to the first splined shaft; said first shaft having fitted about it a splined bored sprocket that is located on the outside of said case that is connected for transmission of rotation by a chain to a second sprocket that is fixed upon the drive side of a one way clutch and located on the outside of said case; the slip side of said one way clutch having a splined bore that is fitted to a second splined shaft that is fitted into the splined bore of the said second friction member mounted for linear rotatable movement upon a fixed axis and set within said case.

4. In a dual surface angular power transfer wheel traction direct drive nipping infinitely variable speed drive, a pair of first and second truncated friction members set within a case and mounted for rotational and linear movement upon splined shafts; said splined shafts being mounted upon fixed axes within said case; said first and second friction members being engaged for transmission of rotation from one to the other and being also shiftable along their axes in a line oblique to the tangential plane of contact; between said first and second friction members a third transmission member and connected for rotational movement upon bearings and having a fixed axis positioned between and slightly above the axis lines of the first and second friction members; said third transmission member set upon said bearings that are set upon and carried by a splined non-rotating housing; said splined housing having a splined hollow slotted non-rotating shaft fitted to it; said shaft being fixed at both ends by splined bores in said case; fitted within said hollow splined slotted shaft is a spring linked at one end of the said hollow slotted splined shaft; said return spring being linked at its other end to one end of a member that is fitted about a screw that rides within the slot of the said hollow slotted splined shaft; said screw being threaded into said splined non-rotating housing; attached to the other end of said member that is fitted about said screw is one end of a speed change chain sprocket; the other end of said speed change chain sprocket is linked to a speed change sprocket; said sprocket being fixed to a shaft of a servo motor; said motor is set upon a base and fixed to the outer side of said case; said first shiftable rotatable friction member having a splined bore that is fitted to the first splined shaft; said first shaft having fitted upon it a splined sprocket that is located on the outside of said case that is connected for transmission of rotation by a chain to a second sprocket that is fixed upon the drive side of a one way clutch and located on the outside of said case; the slip side of said one way clutch having a splined bore that is fitted to a second splined shaft that is fitted into the splined bore of the said second friction member mounted for linear rotatable movement upon a fixed axis and set within a case; affixed between said case and a pressure spring, that is loosely fitted around the said first splined shaft and bears against said first truncated friction members larger diameter, is a hydraulic cylinder with means for activating and deactivating the linear movement of said hydraulic cylinder; said hydraulic cylinder being attached to said case and circumferentially surrounding, but not connected to said first splined shaft that is fitted within the bore of said first shiftable truncated friction member; upon activating the said hydraulic cylinder the said first truncated friction member is driven in a direction that reduces the parallel gap between the said first and second friction member, thereby wedging the said third transmission member.

5. In a dual surface angular power transfer wheel traction direct drive nipping infinitely variable speed drive, a pair of first and second truncated friction members set within a case and mounted for rotational and linear movement upon splined shafts; said splined shafts being mounted upon fixed axes within said case; said first and second friction members being engaged for transmission of rotation from one to the other and being also shiftable along their axes in a line oblique to the tangential plane of contact; between said first and second friction members a third transmission member and connected means mounted for rotational movement upon bearings and having a fixed axis positioned between said slightly above the axis line of the first and second friction members; said third transmission member set upon said bearings that are set upon and carried by a splined non-rotating housing; said splined housing having a splined hollow non-rotating shaft fitted to it; said shaft being fixed at both ends by splined bores in said case; fitted within said hollow splined slotted shaft is a return spring linked at one end of the said hollow slotted splined shaft; said return spring being linked at its other end to one end of a member that is fitted about a screw that rides within the slot of said hollow slotted splined shaft; said screw being threaded into said splined non-rotating housing; attached to the other end of said member that is fitted about said screw is one end of a speed change chain sprocket; the other end of said speed change chain sprocket linked to a speed change sprocket; said sprocket being fixed to a shaft of a servo motor; said motor set upon a base and fixed to the outer side of said case; said first shiftable rotatable friction member having a splined bore that is fitted to the first splined shaft; said first splined shaft having fitted upon it a splined bored sprocket that is located on the outside of said case that is connected for transmission of rotation by a chain to a second sprocket; said second sprockets' ratio difference being equal to the ratio difference between said first friction members' splined input shaft and said second members' splined output shaft; at the lowest speed of the infinitely variable speed drive said second sprocket is fixed upon the drive side of a one way clutch and located on the outside of said case; the slip side of said one way clutch having a splined bore that is fitted to a second splined shaft that is fitted into the splined bore of the said second friction member mounted for linear rotatable movement upon a fixed axis and set within said case.

6. In a dual surface angular power transfer wheel traction direct drive nipping infinitely variable speed drive, a pair of first and second truncated friction members set within a case and mounted for rotational and linear movement upon splined shafts; said splined shafts being mounted upon fixed axes within said case; said first and second friction members being engaged for transmission of rotation from one to the other and being shiftable along their axes in a line oblique to the tangential plane of contact; between said first and second friction members a third transmission member and connected means for rotational movement upon bearings and having a fixed axis positioned between and slightly above the axis lines of the first and second friction members; said transmission member is set upon said bearings that are set upon and carried by a splined non-rotating housing; said splined housing having a splined hollow slotted non-rotating shaft fitted to it; said shaft being fixed at both ends by splined bores in said case; said splined bores in said case being of a dimension suitable for limited vertical and horizontal movement of the said hollow slotted non-rotating splined shaft, allowing the said third dual faced transmission member to be held above the axial centers' of said first and second friction members, when a torsional load is applied to the said second friction member the said third friction member is driven by traction toward the axial centers of the said first and second friction members, thereto said third dual faced transmission member is further wedged.

7. In a dual surface angular power transfer wheel traction direct drive nipping infinitely variable speed drive, a set of three friction members circumferentially surrounding a fourth transmission friction member that is shiftable along its axis in a line oblique to the tangential plane of contact; between said set of three friction members there is a set of three dual faced transmission friction members and connected means mounted for rotational movement upon bearings and having a fixed axis positioned between and slightly above the axis lines of said set of three friction members and said fourth transmission friction member, that is set upon said bearings that are set upon and carried by a splined non-rotating housing having a splined hollow slotted non-rotating shaft fitted to it; the said hollow slotted non-rotating shaft being fixed at both ends; said set of three dual faced transmission friction members having means for transportation between between said set of three transmission friction members and fourth transmission friction member; fixed to the shafts of each said set of three transmission friction members; a set of three sprockets are connected, for simultaneous transmission of said set of three transmission friction members, by a sprocket chain; resulting in a simultaneous transmission of movement upon the said fourth transmission friction member, thereby increasing the torque potential of the variable speed drive.

8. In a dual surface angular power transfer wheel traction direct drive nipping infinitely variable speed drive, a set of three friction members circumferentially surrounding a fourth transmission friction member that is shiftable along its axis in a line oblique to the tangential plane of contact; between said first, second and third transmission friction members are three dual faced transmission friction members and connecting means mounted for rotational movement upon bearings and having a fixed axis positioned between and slightly above the axis lines of said set of three dual faced transmission friction members and said fourth transmission friction member, set upon said bearings that are set upon and carried by a splined non-rotating housings having a splined hollow slotted non-rotating shaft fitted to them; said splined slotted hollow non-rotating shafts being fixed at both ends; said first and second dual faced transmission friction member having means for individual transportation of each said first and second dual faced transmission friction member; said first transmission friction member being in contact with and connected for transmission to the first dual faced transmission friction member; said second transmission friction member being in contact with and connected for transmission to the second dual faced transmission friction member; said second dual faced transmission friction member being in contact with and connected for transmission with said third transmission friction member, resulting in the development of greater speed ratios.

9. In a friction drive a truncated rotating support ballbearing set within a case and mounted for rotation; said truncated support ball bearing being pitched from its axis and in full contact with a truncated friction member; said friction member being set within said case and mounted for rotation; said truncated rotating support ball bearing being on the same plane and having the same included angle, and being of the same diameter on its larger and small ends at the area of contact of said truncated friction member, resulting in a support that substantially reduces flexing under radial pressure of said first truncated friction member, and eliminates velocity differences between said truncated rotating ball bearing and said truncated friction member.

10. In a dual surface angular power transfer wheel traction direct drive nipping infinitely variable speed drive, a set of three friction members circumferentially surrounding a fourth transmission friction member that is shiftable along its axis in a line oblique to the tangential plane of contact; between said set of three friction members a set of three dual faced transmission friction members and connecting means mounted for rotational movement upon bearings and having a fixed axis between and slightly above the axis lines of said set of three friction members and said fourth transmission friction member; set upon said bearings that are set upon and carried by a splined non-rotating housing having a splined hollow slotted non-rotating shaft fitted to it; the said splined hollow slotted on-rotating shafts being fixed at both ends; said set of three dual faced transmission friction members having means for individual transportation of each of the said three dual faced transmission friction members; said fourth transmission friction member acting upon the converging set of three transmission friction members, resulting in each of said set of three transmission friction members yielding independent speed control, or split output speeds.

11. In a dual surface angular traction gear power transfer wheel infinitely variable speed drive, a first truncated friction member set within a case and mounted for rotation and linear movement upon a splined shaft; said splined shaft being mounted upon fixed axis within said case; said truncated friction member being engaged for transmission of rotation to the traction side of a dual surfaced angular traction gear; a second transmission member whose angular traction surfaces' included angles matches precisely and geometrically the included angle of said first truncated friction member; said second transmission member being mounted for rotation upon a shaft; said shaft being so pitched that the said angled traction side of the said second transmission member is in full contact with the surface of the said first truncated friction member; said shaft being mounted upon fixed axis within a shiftable housing; said housing being located along and parallel to the surface of said first truncated friction member; said second transmission members' angular side having beveled gears cut into its diameter; said beveled gear is engaged for transmission with a third shiftable beveled gear transmission member; said third beveled gear having a splined bore that is fitted to a splined output shaft; said splined output shaft is mounted for rotation upon a fixed axis within a case having no rotationable influence upon said shiftable housing; said shiftable housing having two splined bores that are fitted with two splined hollow slotted non-rotating shafts; said shafts being fixed at their end by splined bores insaid case; said splined bores in said case being located dimensionally to maintain said second transmission member and said housing in a fixed axial relationship to said first friction member and third beveled gear transmission member.

12. In a dual surface concave convex curved power transfer wheel traction infinitely variable speed drive, a first semi convex sphered friction member and a second concaved sphered friction member set within a case and mounted for rotational and linear movement upon splined shafts; said spline being mounted upon fixed axes within a case; said first and second friction members being engaged for transmission of rotation from one to the other in an arc, along the plane of contact between said first and second friction members, by a third dual surfaced concave convex curved friction member mounted for rotational movement upon a shaft; said shaft being mounted upon fixed axes within a shiftable housing; said housing being mounted within and at the base of said case; said housing having a means for maintaining the axial relationship and shifting in an arc for a speed change of said third concave and convex curved friction member.

13. In a dual surface angular power transfer wheel traction infinitely variable speed drive, a first truncated 45 degree angled cone friction member and a second concave 45 degree angled friction member whose axis is set at a 90 degree angle to the first said friction member, and set within a case and mounted for rotational and linear movement upon splined shafts; said splined shafts being being mounted upon fixed axis within said case; said first and second friction members being engaged for transmission of rotation from one to the other in a line along the plane of contact between said between said first and second friction members by a third dual surfaced angled friction member; said third friction member having a 45 degree angle on both of its outer diameters' angles; said third friction member is mounted for rotation upon a shaft; said shaft being mounted upon fixed axes within a shiftable housing; said housing having means for maintaining the axial relationship and the shifting in a 45 degree angle of the said third dual surfaced angular friction member and the said axial relationship.

* * * * *